(12) United States Patent
Wang

(10) Patent No.: US 7,729,919 B2
(45) Date of Patent: Jun. 1, 2010

(54) COMBINING USE OF A STEPWISE MARKUP LANGUAGE AND AN OBJECT ORIENTED DEVELOPMENT TOOL

(75) Inventor: Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1214 days.

(21) Appl. No.: 10/613,631

(22) Filed: Jul. 3, 2003

(65) Prior Publication Data
US 2005/0004800 A1 Jan. 6, 2005

(51) Int. Cl.
*G10L 21/00* (2006.01)
(52) U.S. Cl. ............ 704/275; 704/270; 704/270.1
(58) Field of Classification Search .......... 704/270–275
See application file for complete search history.

(56) References Cited

U.S. PATENT DOCUMENTS

| | | | |
|---|---|---|---|
| 5,860,059 A * | 1/1999 | Aust et al. ............ | 704/231 |
| 6,119,151 A | 9/2000 | Cantrell et al. | |
| 6,246,983 B1 * | 6/2001 | Zou et al. ............ | 704/260 |
| 6,314,402 B1 | 11/2001 | Monaco et al. ........ | 704/275 |
| 6,510,414 B1 * | 1/2003 | Chaves ............... | 704/270 |
| 6,922,411 B1 * | 7/2005 | Taylor ............... | 370/401 |
| 7,003,459 B1 * | 2/2006 | Gorin et al. .......... | 704/240 |
| 7,424,429 B2 * | 9/2008 | Nakagawa et al. ...... | 704/257 |
| 2001/0049599 A1 * | 12/2001 | Brotman et al. ........ | 704/231 |
| 2003/0055651 A1 | 3/2003 | Pfeiffer et al. | |
| 2003/0149565 A1 * | 8/2003 | Chang et al. .......... | 704/250 |
| 2003/0212561 A1 * | 11/2003 | Williams et al. ....... | 704/270.1 |
| 2004/0006474 A1 * | 1/2004 | Gong et al. ........... | 704/270.1 |
| 2004/0019476 A1 * | 1/2004 | Glynn ................ | 704/1 |
| 2004/0061717 A1 * | 4/2004 | Menon et al. .......... | 345/727 |
| 2004/0086095 A1 * | 5/2004 | Dixit et al. .......... | 379/88.17 |
| 2004/0125794 A1 * | 7/2004 | Marquette et al. ...... | 370/355 |
| 2004/1015332 * | 8/2004 | Neuberger et al. ...... | 704/270.1 |

FOREIGN PATENT DOCUMENTS

| | | |
|---|---|---|
| RU | 2073913 C1 | 2/1997 |
| RU | 2170454 | 7/2001 |
| WO | WO 02/091364 A1 | 11/2002 |

OTHER PUBLICATIONS

Burnett, Daniel C.: "Speech Objects Specification V1.0" [Online] Nov. 14, 2000, XP002298447 Internet Retrieved from the Internet: URL: http://www.w3.org/TR/2000/NOTE-speechobjects-20001114.

(Continued)

*Primary Examiner*—Richemond Dorvil
*Assistant Examiner*—Eric Yen
(74) *Attorney, Agent, or Firm*—Christopher J. Volkman; Westman, Champlin, & Kelly, P.A.

(57) ABSTRACT

The present invention provides a system and method for combining VoiceXML with an speech application development tool such as SALT. In one aspect of the present invention, a VoiceXML module includes VoiceXML executable instructions. A SALT module includes speech application language tags to execute instructions associated with the VoiceXML module.

28 Claims, 14 Drawing Sheets

OTHER PUBLICATIONS

Burnett, Daniel C. "SpeechObjects Specification V1.0," Online—Nov. 2000.

European Search Report.

Signer et al., "Aural Interfaces to Databases Based on VoiceXML", Institute for Information Systems, Swiss Federal Institute of Technology, CH-8092 Zurich Switzerland, pp. 1-15.

Ball et al., "Sisl: Several Interfaces, Single Logic", Microsoft Research, Software Production Research Dept. and Dept. of Mathematical and Computer Sciences, pp. 1-20, Jan. 6, 2000.

Cross et al., "XHTML+Voice Profile 1.1", http://www.ibm.com/software/pervasive/multimodal/x+v/11/spec.htm, pp. 1-41, Jan. 28, 2003.

McGlashan et al., "Voice Extensible Markup Language (VoiceXML) Version 2.0", http://www.w3.org/TF/voicexml20, pp. 1-235, Jan. 28, 2003.

Cisco Systems Inc., et al., "SALTS Speech Application Language Tags (SALT) 1.0 Specification", pp. 1-112, Jul. 15, 2002.

Raggett, "Getting Started with VoiceXML 2.0", http://www.w3org/Voice/Guide, pp. 1-10, revised Nov. 14, 2001.

Eisenzopf, "VoiceXML and the Future of SALT", Business Communications Review, pp. 54-59, May 2002 (http://www.bcr.com/bcrmag/2002/05/p54.asp).

Potter et al., "VoiceXML and SALT-How are they different and why?" Speech Technology Magazine, pp. 1-3, May/Jun. 2002 (http://www.speechtechmag.com).

Marsan, "Shakin' On the SALT", Network World, Sep. 23, 2002, pp. 1-4, htt://www.nwfushion.com/buzz/2002/salt.html.

Eisenzopf, "SALT Submission to W3C Could Impact the Future of VoiceXML", pp. 1-3, Oct. 4 2002, (www.developer.com/voice/article.php/1567021).

Chinese Office Action, Dec. 1, 2006, 10 pages.

Decision on Rejection from Chinese Patent Application 200410063247.4, filed Jun. 30, 2004.

Official Action of the Russian Patent Office in counterpart foreign application No. 2004120266 filed Jul. 2, 2004.

Communication from European patent application 04 014 016.2, dated Feb. 5, 2009.

Third Office Action from Chinese patent application No. 200410063247.4, dated Apr. 24, 2009.

Official Decision on Grant from Russian Patent Application 2004120266, filed Jul. 2, 2004 (English Translation Provided).

* cited by examiner

```
450 ─┐
     \
     <v:vxml xmlns:v="http://www.voicexmlforum.org/2001/VoiceXML"
             xmlns:s="http://www.saltforum.org/2002/SALT">             ── 452
        <v:form>  ←──── 454
           <v:assign name="answer" value=""/>  ←──── 456

<v:field name="city">  ←──── 458                         ── 460
              <v:prompt>Please say the city you want to search for zip code</v:prompt>
462 ──►    <s:listen>
              <s:grammar src="city.grxml"/>  ←──── 464
              <s: grammar src="state.grxml"/>  ←──── 465
           </s:listen>
           </v:field>

<v:field name="state">  ←──── 466                        ── 468
              <v:prompt>Please say the state you want to search for zip code</v:prompt>
470 ──►    <s:listen>
              <s:grammar src="city.grxml"/>  ←──── 472
              <s: grammar src="state.grxml"/>  ←──── 474
           </s:listen>
           </v:field>

<v:filled>  ←──── 476
              <s:prompt>Please wait while I connect to the Web service</s:prompt>
              <s:smex>  ←──── 474
480 ──►       <s:param name="server">http://acme.org/zipcode.asmx</s:param>
              <s:param name="envelop">
481 ──►          <s:value targetElement="city"/>
                 <s:value targetElement="state"/>
                 <s:bind targetElement="answer" value="//zipcode" />  ←──── 482
              </s:smex>                                              ── 484
              <s:prompt>The zip code for <s:value targetElement="city"/> <s:value
              targetElement="city"/> is <s:value targetElement="answer"/></s:prompt>
           </v:filled>

</v:field>
        </v:form>
     </v:vxml>
```

FIG. 14

COMBINING USE OF A STEPWISE MARKUP LANGUAGE AND AN OBJECT ORIENTED DEVELOPMENT TOOL

BACKGROUND OF THE INVENTION

The present invention relates to programming of speech enabled applications. More particularly, the present invention relates to combining use of a stepwise voice markup language and object oriented speech application extensions.

Advances in computer user/interfaces have allowed users to interact with a computer through voice commands. Voice portals such as through the use of VoiceXML (Voice Extensible Markup Language) have been advanced to allow internet content to be accessed using voice input. In this architecture, a document server (for example, a web server) processes requests from a client through a VoiceXML interpreter. The web server can produce VoiceXML documents and replies, which are processed by the VoiceXML interpreter and rendered audibly to the user. Using specified voice commands through voice recognition, the user can navigate the web and listen to data audibly rendered.

The VoiceXML development language has been designed in order to allow authors control over dialog between a user and a speech application. VoiceXML follows a stepwise method, where the application controls dialog flow and queries a user in order to fill in a form or make choices from a menu. A VoiceXML application performs a number of steps in order to render data to a user or fill in data in a form. More particularly, VoiceXML follows a form interpretation algorithm that drives interaction between a user and a VoiceXML form or menu. The algorithm continues to loop through the form or menu until values are filled, choices are made or an exception is encountered.

Speech enabled applications may also be developed through the use of a markup language extension such as Speech Application Language Tags (SALT). SALT enables multi-modal and telephony enabled access to information, applications and web services from personal computers, telephones, personal digital assistants and other computing devices. SALT-extends existing markup languages such as HTML, X-HTML and XML. Multi-modal access using SALT enables users to interact with an application in a variety of different ways, for example using a keyboard, speech, mouse and/or stylus or combinations thereof.

In contrast to VoiceXML, SALT is based on an object oriented programming approach, wherein applications are composed of various objects, triggers and events. The object oriented approach enables application authors to customize dialog flows between a user and an application. When an event is encountered in SALT, a SALT based application executes various commands based on the event. In this manner, a user can control dialog flow, which can be a more efficient and/or natural form of computer interaction.

Applications utilizing the stepwise approach of VoiceXML do not currently utilize the flexibility offered by the object oriented programming approach used by speech application tools such as SALT. As a result, VoiceXML applications have difficulty dealing with mixed-initiative situations (wherein the user may request data from several different categories), external messaging and enhanced call control. As a result, a system or method providing the programming flexibility of SALT in VoiceXML would be beneficial.

SUMMARY OF THE INVENTION

The present invention provides a system and method for combining a stepwise instruction execution algorithm and an object oriented module. In one aspect of the present invention, a program executable by a computer includes a stepwise module having instructions executed in a defined order based on an execution algorithm. An object oriented module includes objects having temporal triggers for initializing operations associated with the instructions.

In another aspect of the present invention, a VoiceXML module includes VoiceXML executable instructions. A SALT module includes speech application language tags to execute instructions associated with the VoiceXML module. In a further embodiment, the VoiceXML module can be used to declare first and second VoiceXML fields and the SALT module initializes a recognition event to obtain speech input from a user. The SALT module fills the first VoiceXML field with a first portion of the speech input and the second VoiceXML field with a second portion of the speech input. Additionally, the SALT module may include multiple grammars that recognize speech input and associates the input with a particular grammar and/or field.

A further aspect of the present invention is a method for providing an interactive user interface. The method establishes a stepwise dialog executing instructions in a defined order. The instructions include objects for processing events associated with at least one of recognition, prompting and messaging. An object oriented operation is performed when encountering object associated with the instructions. The operation provides at lease one but not all of events in the dialog associated with recognition, prompting and messaging.

BRIEF DESCRIPTION OF THE DRAWINGS

FIG. 14 is an exemplary markup page according to an embodiment of the present invention.

DETAILED DESCRIPTION OF ILLUSTRATIVE EMBODIMENTS

Figure 1:
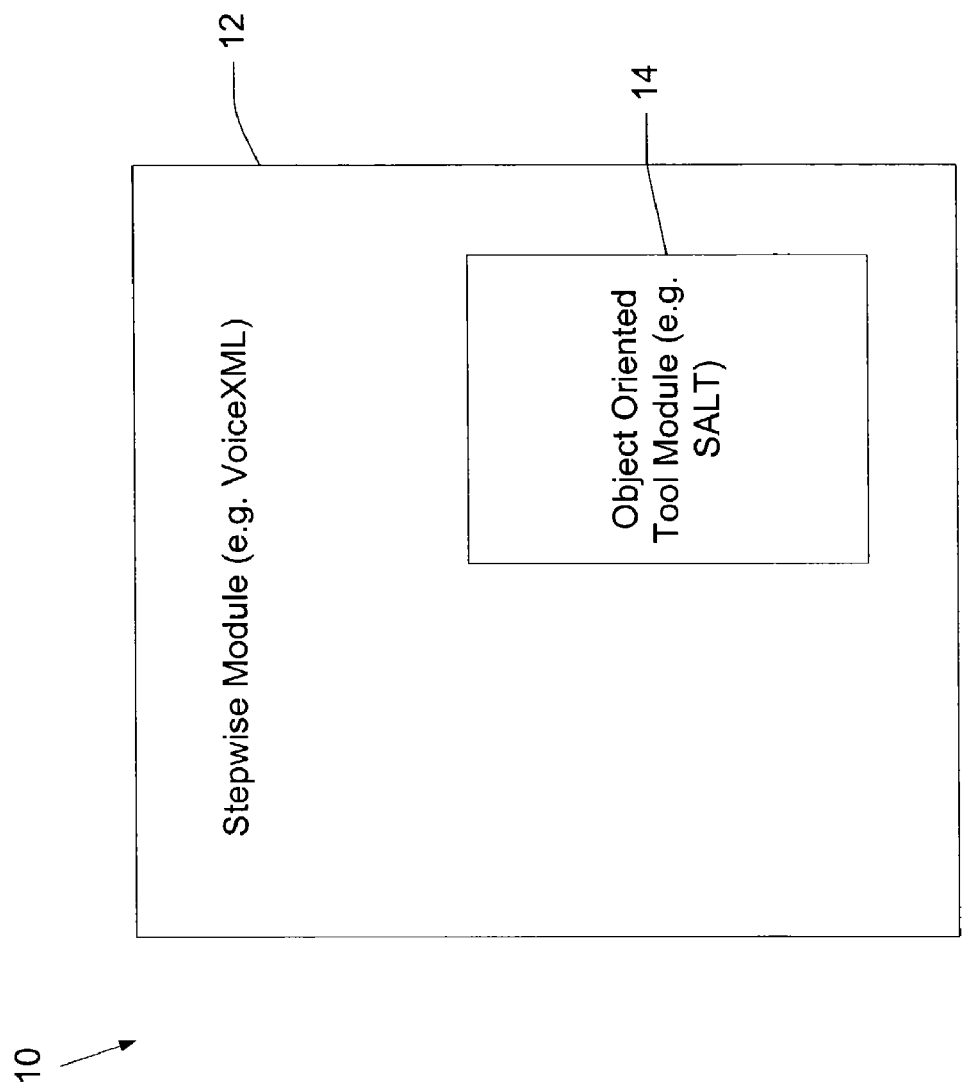
FIG. 1 is a block diagram of a system utilizing a stepwise module and a object oriented module.

FIG. 1 illustrates a system 10 for combining the use of a stepwise language such as VoiceXML and an object oriented speech application development tool such as SALT. System 10 includes a stepwise module 12, for example a VoiceXML module, and an object oriented speech application development tool module 14, for example a SALT module. A stepwise module includes instructions that are executed in a defined order given an execution algorithm. An object oriented development tool module includes programming objects that perform various operations. As used herein, VoiceXML refers to the Voice Extensible Markup Language, which is a W3C (World Wide Web Consortium) Candidate Recommendation. A copy of the Specification for VoiceXML Version 2.0 can be found at www.w3.org/TR/voicexml20. Additionally, SALT refers to Speech Application Language Tags developed by the SALT Forum. A copy of the SALT 1.0 Specification is available at www.SALTforum.org. VoiceXML executes stepwise instructions based on a form interpretation algorithm.

One aspect of the present invention includes incorporating one or more object oriented modules 14 in the executable instructions of stepwise module 12. Object oriented modules 14 include temporal triggers that initiate operations when the trigger is encountered by the execution algorithm of stepwise module 12. The triggers may include various events such as an error, exception, receipt of a message, recognition and/or no recognition or combinations thereof. The operations that are performed include operations such as speech recognition, DTMF recognition, audio collection, audio playback and others.

When encountering an object oriented module 14, (e.g. a SALT tag) under operation of stepwise module 12 (e.g. a VoiceXML module), the interaction between the SALT tag and the VoiceXML module 12 is defined to enable SALT to be utilized within VoiceXML. For example, when triggering a speech recognition based on multiple grammars using a SALT tag, instructions relating to placing each of the units in separate fields allows the SALT module to be embedded within the VoiceXML module. When utilizing the messaging capabilities of SALT, messaging instructions are embedded into loops of the form interpretation algorithm. By embedding an object oriented module 14 within the stepwise module 12, the functionality and flexibility of the resulting application can be enhanced over what is available using simply a stepwise language such as VoiceXML.

A method for providing an interactive user interface is another aspect of the present invention that can embodied in system 10. Stepwise module 12 can establish a stepwise dialog with a user that executes instructions in a defined order, for example through a VoiceXML form or menu. The instructions process dialog events associated with recognition prompting and/or messaging. The object oriented module 14 performs object oriented operations (e.g. by executing SALT tags) when encountered within the dialog for at least one but not all of recognition, prompting or messaging. In one embodiment, the stepwise dialog includes VoiceXML that performs instructions and SALT tags that execute object oriented operations.

Given the broad description of a system for developing speech applications, it may be useful to describe generally computing devices that can function in system 10 described above. As appreciated by those skilled in the art, the components of system 10 may be located within a single computer or distributed across a distributed computing environment using network connections and protocols.

Figure 2:
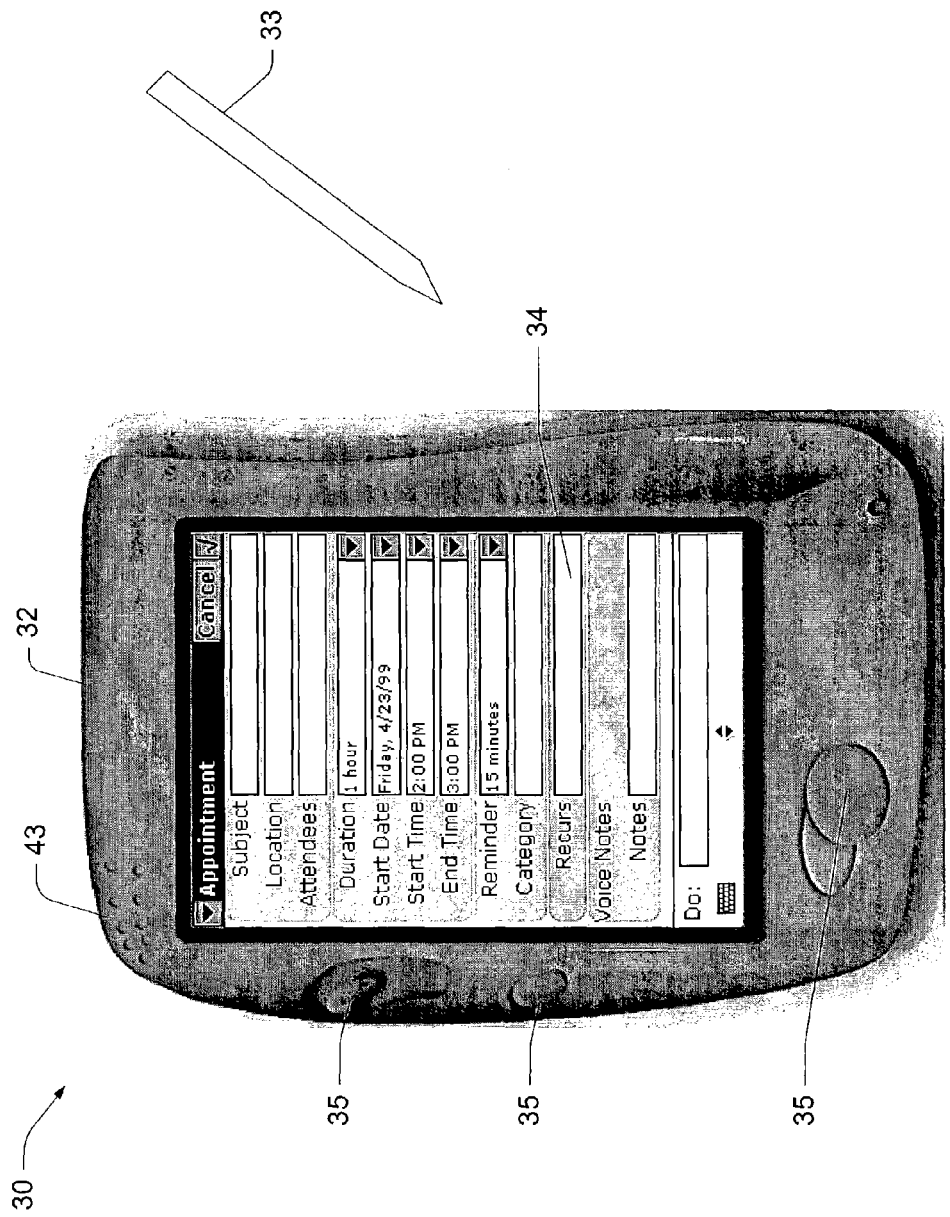
FIG. 2 is a plan view of a computing device operating environment.

Referring now to FIG. 2, an exemplary form of a mobile device such as a data management device (PIM, PDA or the like) is illustrated at 30. However, it is contemplated that the present invention can also be practiced using other computing devices discussed below. For example, phones and/or data management devices will also benefit from the present invention. Such devices will have an enhanced utility compared to existing portable personal information management devices and other portable electronic devices.

An exemplary form of a data management mobile device 30 is illustrated in FIG. 2. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 3:
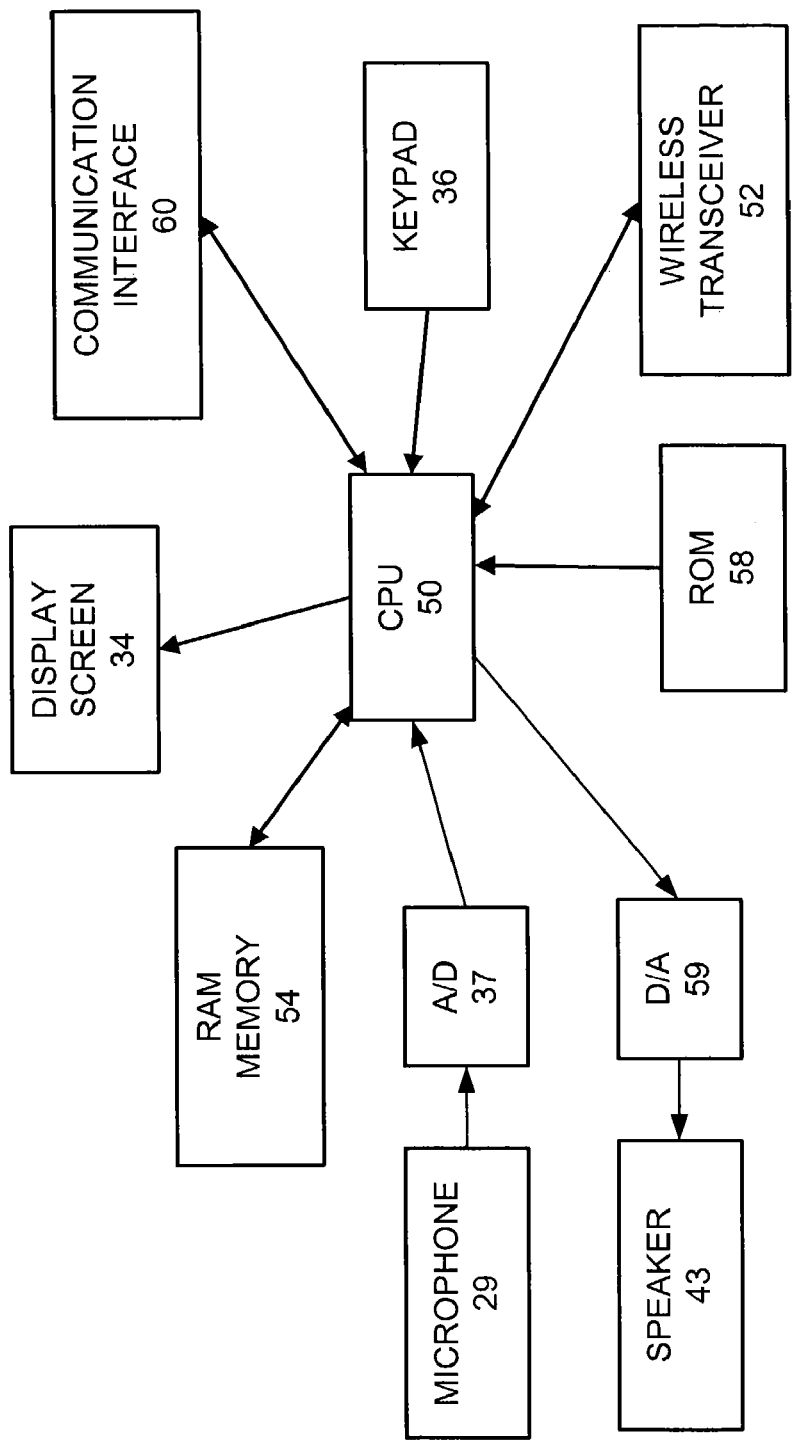
FIG. 3 is a block diagram of the computing device of FIG. 2.

Referring now to FIG. 3, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile device 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data can be transmitted to a remote recognition server 204 discussed below and illustrated in the architecture of FIG. 6. Recognition results are then returned to mobile device 30 for rendering (e.g. visual and/or audible) thereon, and eventual transmission to a web server 202 (FIG. 6), wherein the web server 202 and mobile device 30 operate in a client/server relationship. Similar processing can be used for other forms of input. For example, handwriting input can be digitized with or without pre-processing on device 30. Like the speech data, this form of input can be transmitted to the recognition server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

Figure 4:
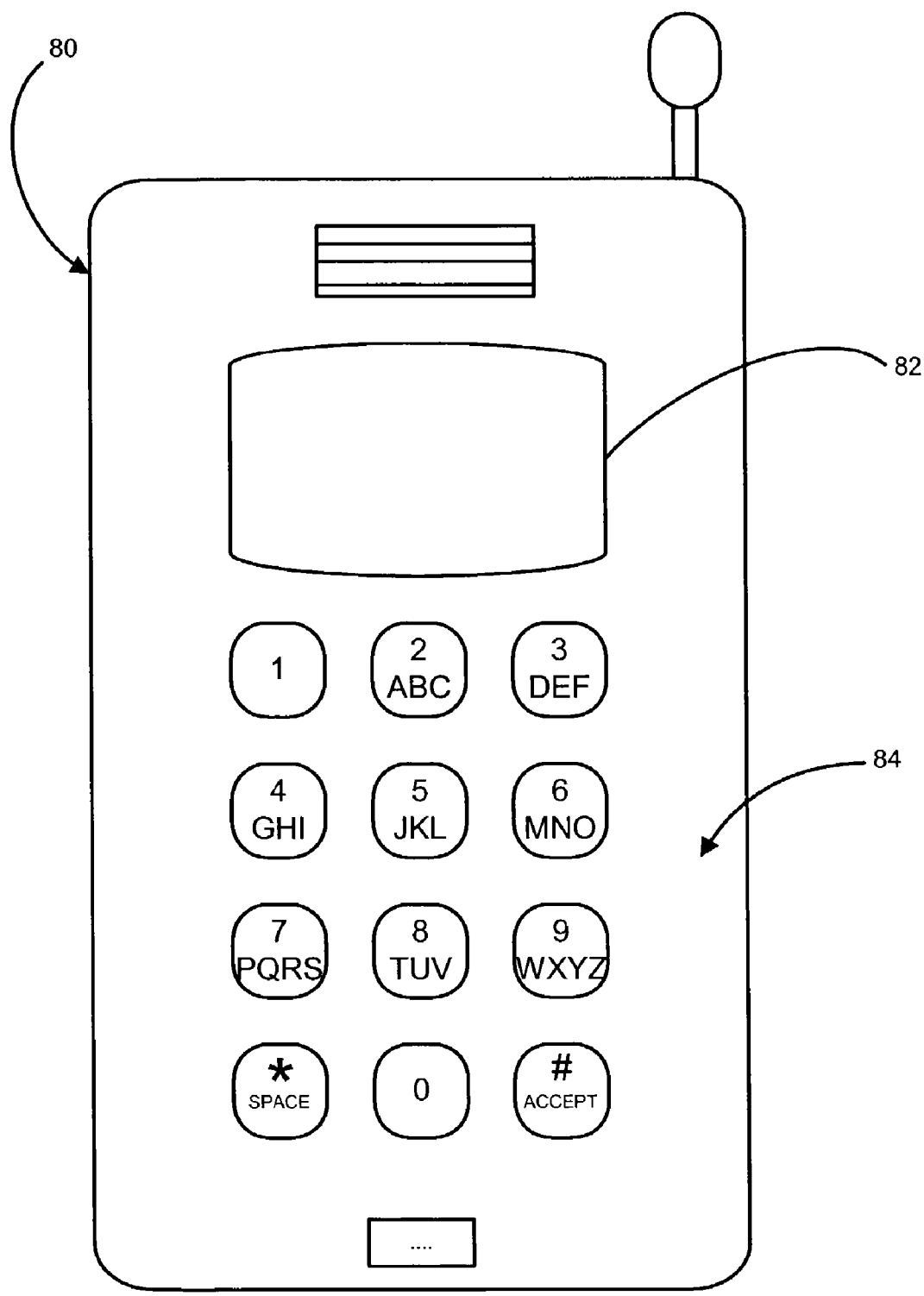
FIG. 4 is a plan view of a telephone.

FIG. 4 is a plan view of an exemplary embodiment of a portable phone 80. The phone 80 includes a display 82 and a keypad 84. Generally, the block diagram of FIG. 3 applies to the phone of FIG. 4, although additional circuitry necessary to perform other functions may be required. For instance, a transceiver necessary to operate as a phone will be required for the embodiment of FIG. 3; however, such circuitry is not pertinent to the present invention.

In addition to the portable or mobile computing devices described above, it should also be understood that the present invention can be used with numerous other computing devices such as a general desktop computer. For instance, the present invention will allow a user with limited physical abilities to input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, tablet computers, multiprocessor systems, microprocessor-based systems, set top boxes, programmable consumer electronics, network PCs, minicomputers, mainframe computers, distributed computing environments that include any of the above systems or devices, and the like.

Figure 5:
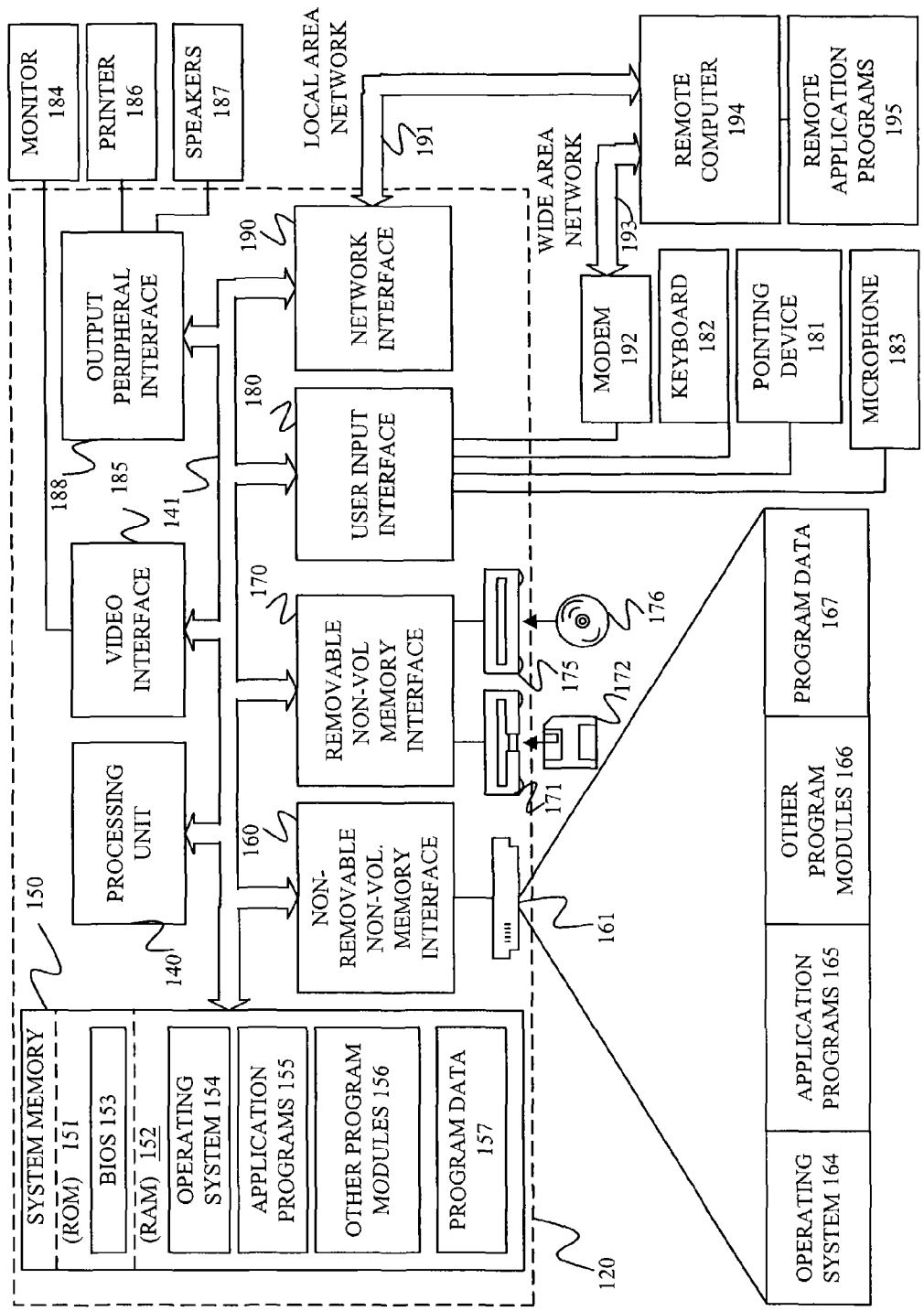
FIG. 5 is a block diagram of a general purpose computer.

The following is a brief description of a general purpose computer 120 illustrated in FIG. 5. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 5, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 5 illustrates operating system 154, application programs 155, other program modules 156, and program data 157.

The computer 120 may also include other removable/non-removable volatile/nonvolatile computer storage media. By way of example only, FIG. 5 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 5, provide storage of computer readable instructions, data structures, program modules and other data for the computer 120. In FIG. 5, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 5 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 5 illustrates remote application programs 195 as residing on remote computer 194. It will be appreciated that the network connections shown are exemplary and other means of establishing a communications link between the computers may be used.

Figure 6:
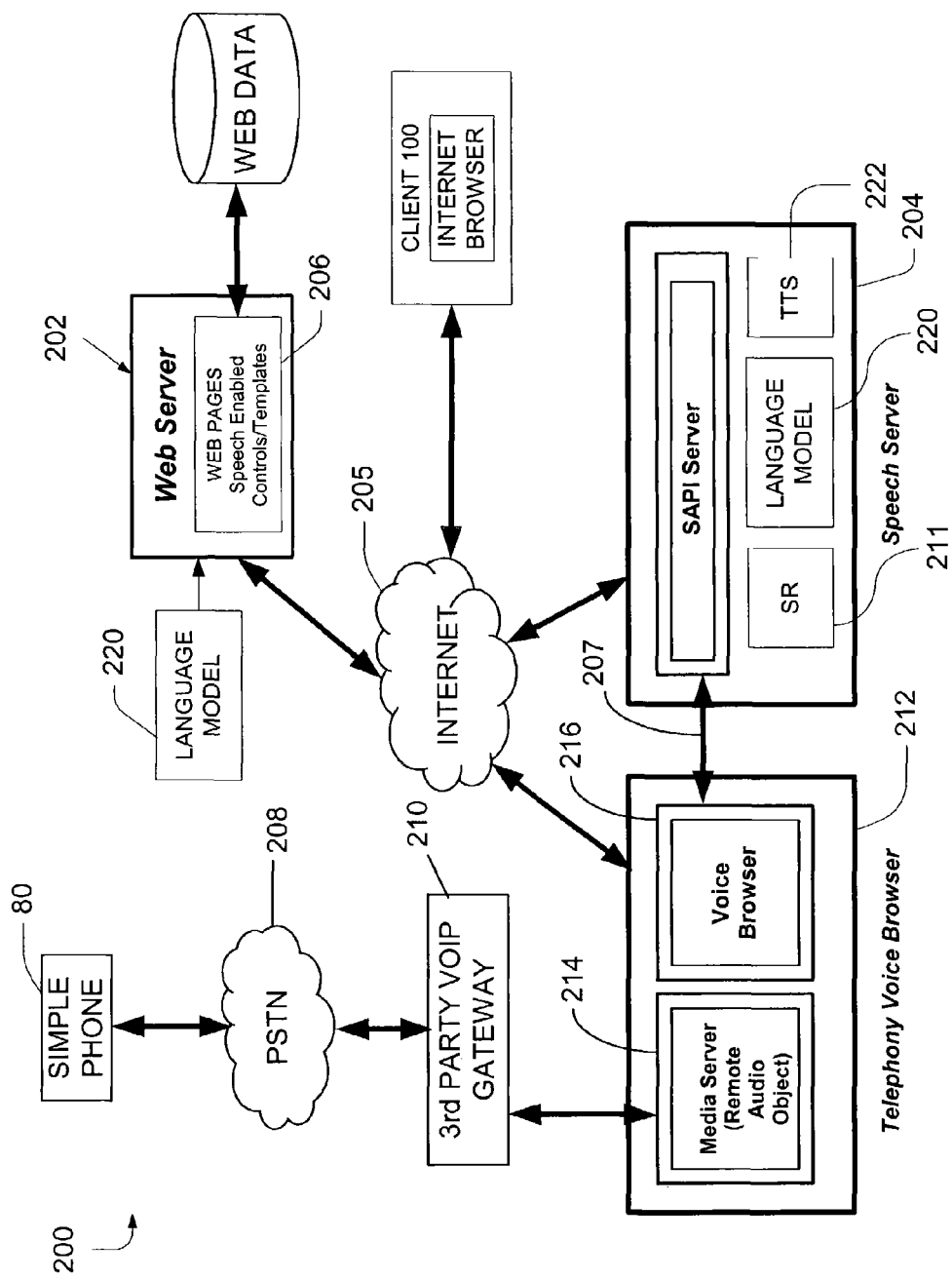
FIG. 6 is a block diagram of an architecture for a client/server system.

FIG. 6 illustrates architecture 200 for web based recognition and data rendering, which is one exemplary environment for the present invention. Generally, information stored in a web server 202 can be accessed through a client 100 such as mobile device 30 or computer 120 (which herein represent other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this embodiment, architecture 200 is unified in that whether information is obtained through client 100 or phone 80 using speech recognition, a single recognition server 204 can support either mode of operation. In addition, architecture 200 operates using an extension of well-known markup languages (e.g. HTML, XHTML, cHTML, XML, WML, and the like). Thus, information stored on web server 202 can also be accessed using well-known GUI methods found in these markup languages. By using an extension of well-known markup languages, authoring on the web server 202 is easier, and legacy applications currently existing can be also easily modified to include voice recognition.

Generally, client 100 executes HTML pages, scripts, or the like, generally indicated at 206, provided by web server 202 using a browser. When voice recognition is required, by way of example, speech data, which can be digitized audio signals or speech features wherein the audio signals have been preprocessed by client 100 as discussed above, are provided to recognition server 204 with an indication of a grammar or language model 220 to use during speech recognition, which may be provided by client 100. Alternatively, speech server 204 may include the language model 220. The implementation of the recognition server 204 can take many forms, one of which is illustrated, but generally includes a recognizer 211. The results of recognition are provided back to client 100 for local rendering if desired or appropriate. If desired, text-to-speech module 222 can be used to provide spoken text to client 100. Upon compilation of information through recognition and any graphical user interface if used, client 100 sends the information to web server 202 for further processing and receipt of further HTML pages/scripts, if necessary.

As illustrated in FIG. 6, client 100, web server 202 and recognition server 204 are commonly connected, and separately addressable, through a network 205, herein a wide area network such as the Internet. It therefore is not necessary that any of these devices be physically located adjacent each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. Web server 202 can also include an authoring mechanism that can dynamically generate client-side markups and scripts. In a further embodiment, the web server 202, recognition server 204 and client 100 may be combined depending on the capabilities of the implementing machines. For instance, if the client 100 comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephony voice browser 212 includes a media server 214 that provides a telephony interface and a voice browser 216. Like client 100, telephony voice browser 212 receives HTML pages/scripts or the like from web server 202. In one embodiment, the HTML pages/scripts are of the form similar to HTML pages/scripts provided to client 100. In this manner, web server 202 need not support client 100 and phone 80 separately, or even support standard GUI clients separately. Rather, a common markup language can be used. In addition, like client 100, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 5.

By utilizing speech application development tools embedded within VoiceXML, the functionality of a VoiceXML markup page is enhanced. Although the form interpretation algorithm of VoiceXML is designed for interactive voice response applications, utilizing other tools within VoiceXML provides a more user friendly, robust application. In order to embed speech application development tools into VoiceXML, interaction between VoiceXML instructions and development tool instructions is provided.

Figure 7:
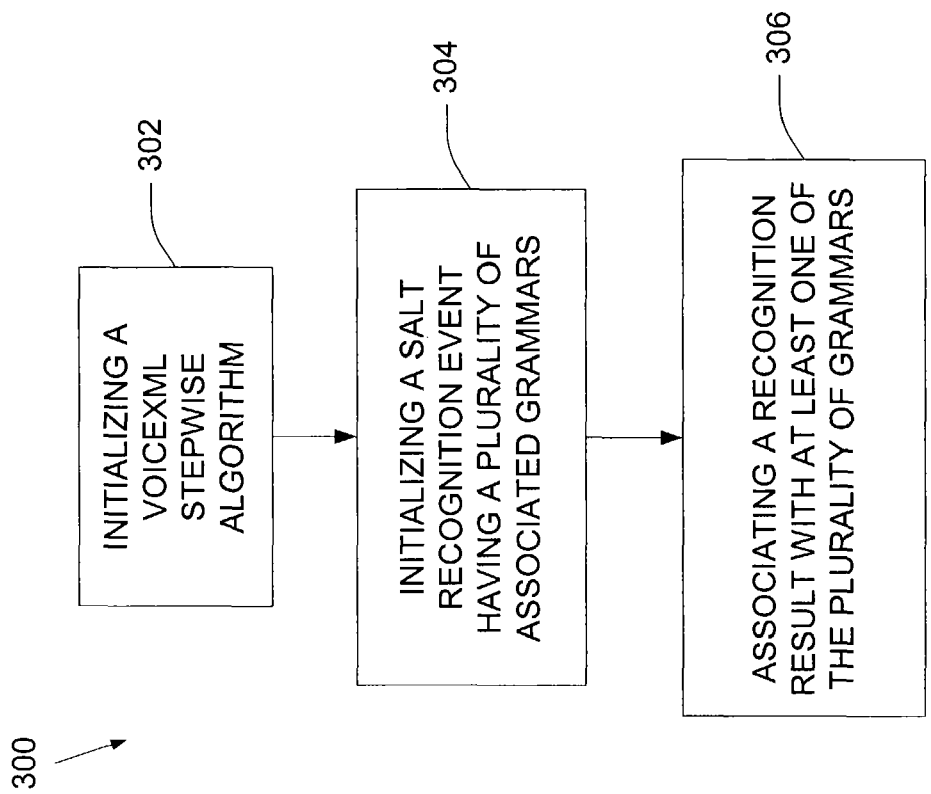
FIG. 7 is a block diagram of a method according to an embodiment of the present invention.

FIG. 7 illustrates a method 300 according to an embodiment of the present invention. The method begins at step 302 wherein a VoiceXML stepwise algorithm is initialized. For example, the algorithm may be initialized upon declaring a form or menu in a VoiceXML markup page by using a <form> tag or a <menu> tag, respectively. Once the algorithm is initialized, the steps in a VoiceXML page will continually loop until certain conditions are met. After step 302, the method proceeds to step 304 wherein a SALT recognition event having a plurality of associated grammars is initialized. The SALT recognition event can be triggered by using a listen tag. With a plurality of grammars, multiple grammar tags are used to initiate use of, each of the grammars. For example, one grammar could be used to recognize a city and another grammar could be used to recognize a state in an application querying the user for an address. Alternatively, one grammar could recognize categories and further grammars could recognize subcategories associated with the categories.

Once an utterance of speech and/or DTMF input has been given by the user, the method proceeds to step 306, where a recognition result is associated with at least one of the plurality of grammars. For example, having a welcome page that recognizes a number of categories (i.e. sports, weather, stock quotes, movies, traffic) and a number of subcategories (i.e. basketball, baseball, football, hockey for a sports category) allows a user to input either one of the categories or one of the subcategories to be recognized and associated with a particular grammar. Once associated with a particular grammar, the input from the user can be analyzed and used by the speech application. For example, if a user utters "hockey", the scores and highlights from the day's hockey events can be rendered to the user.

VoiceXML only allows a single grammar during recognition. Thus, a user must navigate through multiple categories and subcategories to get to relevant information or a relatively large grammar must be used. By using a SALT <listen> tag embedded within the VoiceXML instructions, speech input can be associated with a particular grammar and/or associated with a particular field, for example by using a <bind> element.

Figure 8:
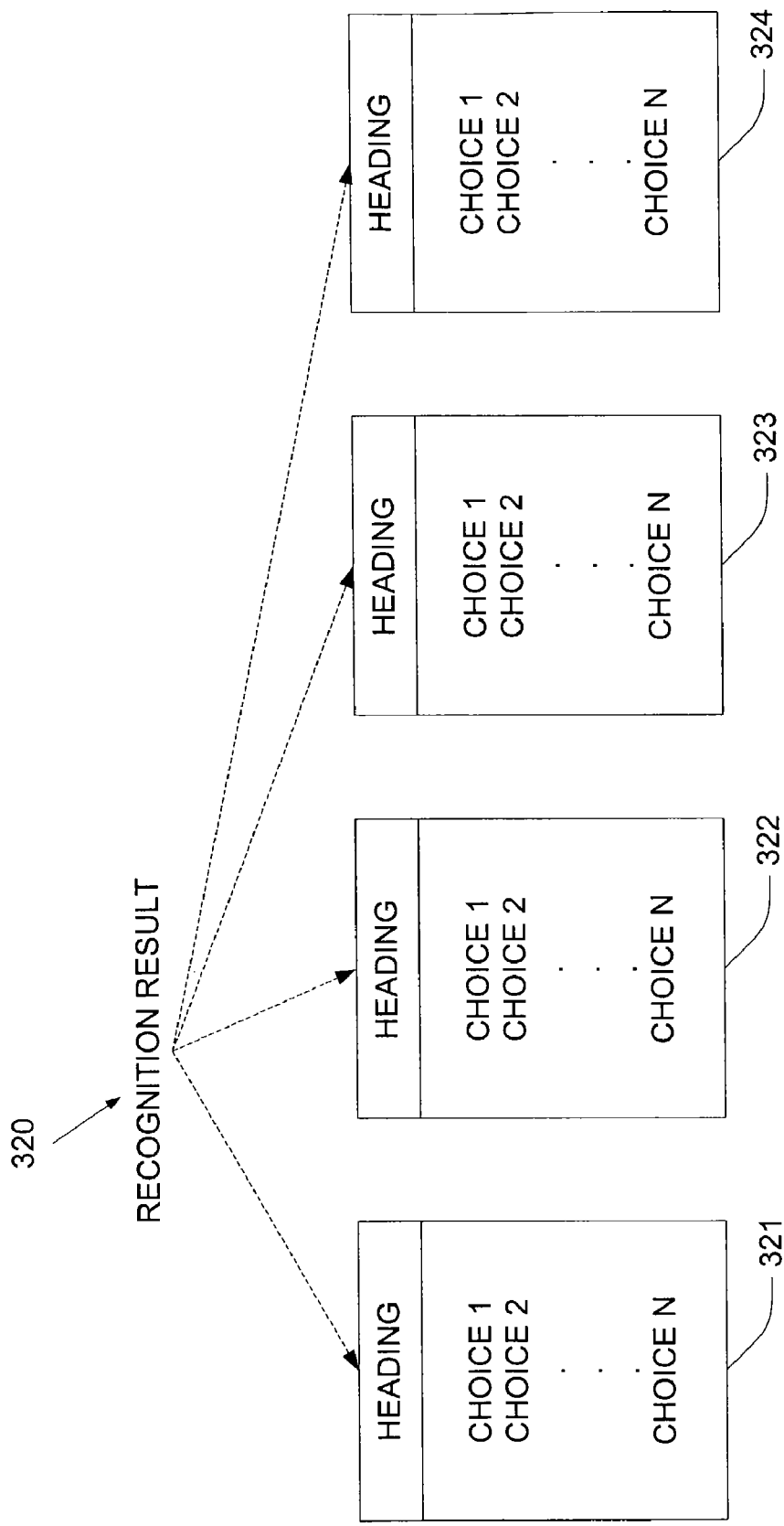
FIG. 8 is a block diagram of a recognition result and a plurality of grammars.

FIG. 8 illustrates a block diagram of a recognition result 320 and a plurality of grammars 321 through 324. When using method 300, recognition result 320 may be associated with each of the grammars 321-324 and/or a particular choice or heading in each of the grammars 321 and 324.

Figure 9:
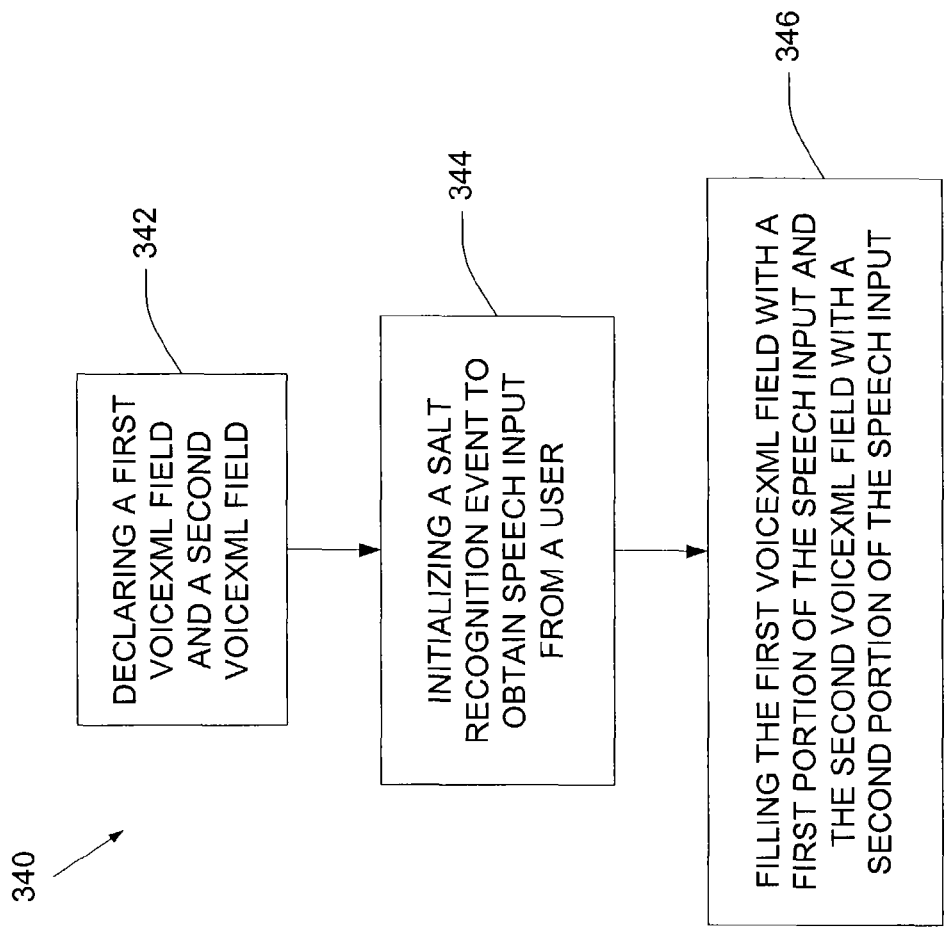
FIG. 9 is a block diagram of a method according to an embodiment of the present invention.

FIG. 9 illustrates a method 340 according to another embodiment of the present invention. At step 342, a first VoiceXML field and a second VoiceXML field are declared. When declaring a VoiceXML field, the form interpretation algorithm is instantiated, which will continue to loop through the VoiceXML executable instructions within a form until the first and second VoiceXML fields have been filled. After the fields have been declared, a SALT recognition event to obtain speech input from a user is initialized at step 344. The recognition event may be triggered, for example, by using a listen tag that includes one or more grammar elements. The speech input from a user can include multiple portions from a single utterance. At step 346, the first VoiceXML field is filled with a first portion of the speech input and the second VoiceXML field is filled with a second portion of the speech input. For example, a user may wish to enter a departure city and an arrival city for flight information or may enter a cuisine type and a location for restaurant information.

Figure 10:
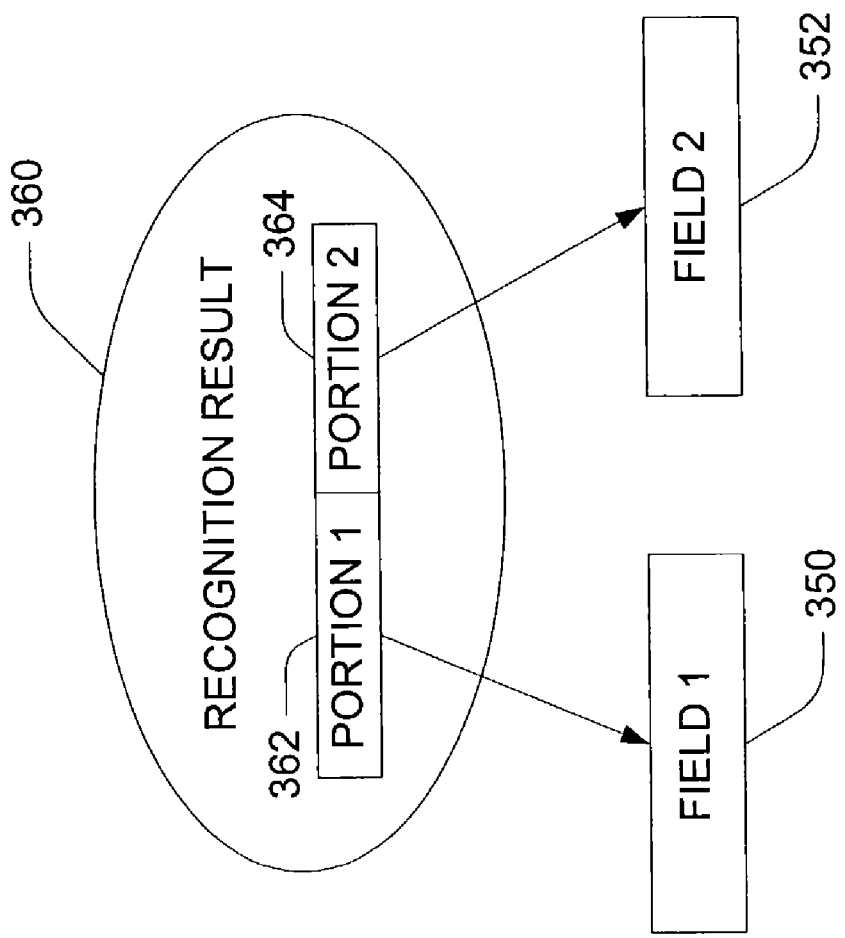
FIG. 10 is a block diagram of a recognition result and a plurality of fields.

FIG. 10 illustrates a block diagram of fields and speech input. Field 350 and field 352 are declared by a VoiceXML module and a recognition result 360 is recognized based on speech input from the user. The result 360 includes a first portion 362 and a second portion 364. Using result 360, the first portion 362 is filled into field 350 while the second portion 364 is filled into field 352. As a result, an author is able to program a speech application to recognize multiple inputs from a user and place them into appropriate fields based on the recognition result.

Figure 11:
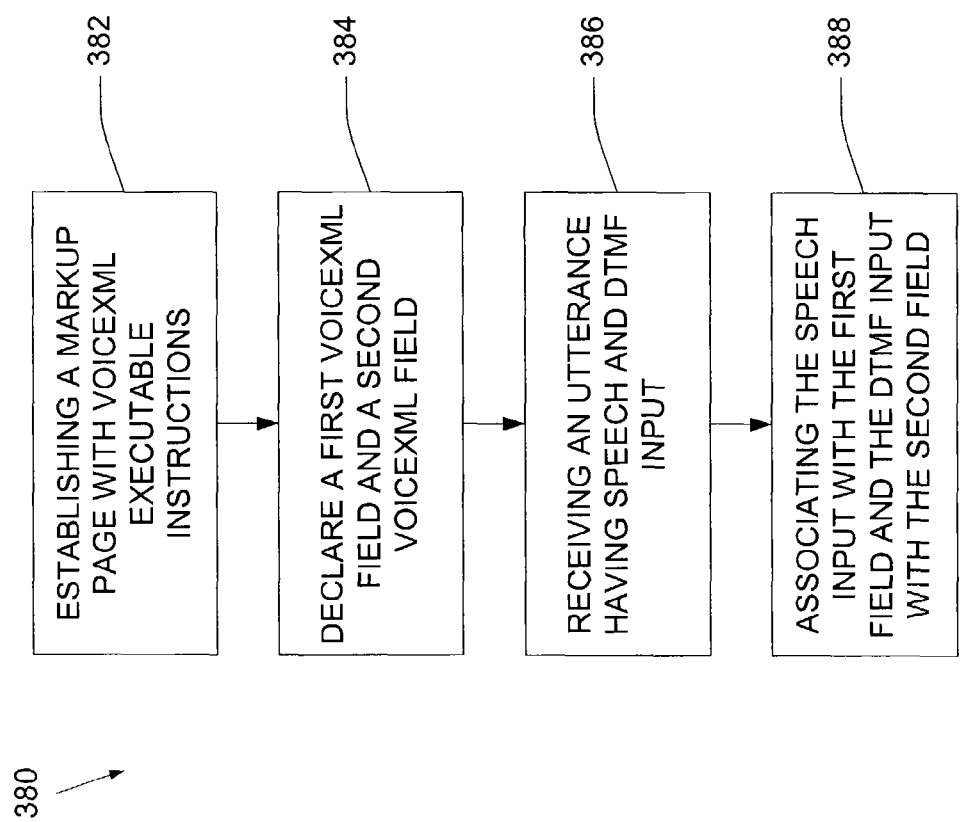
FIG. 11 is a block diagram of a method according to an embodiment of the present invention.

FIG. 11 illustrates another method 380 according to an embodiment of the present invention. Method 380 starts at step 382 wherein a markup page with VoiceXML executable instructions is established. At step 384, a first field and a second field are declared. After the first field and the second field are declared, an utterance of both speech and DTMF input is received from the user. For example, a user may utter, "Please transfer [DTMF input] amount of dollars from my checking account to my savings account." In this case, instead of verbally saying the amount to be transferred, the user typed in the amount using a keypad. At step 388, the speech input is recognized using SALT and then associated with the first field and the DTMF input is recognized using SALT and then associated with the second field. For example, the amount entered as DTMF input may be put into an amount field and the speech input may be associated with a transfer from checking to savings.

Figure 12:
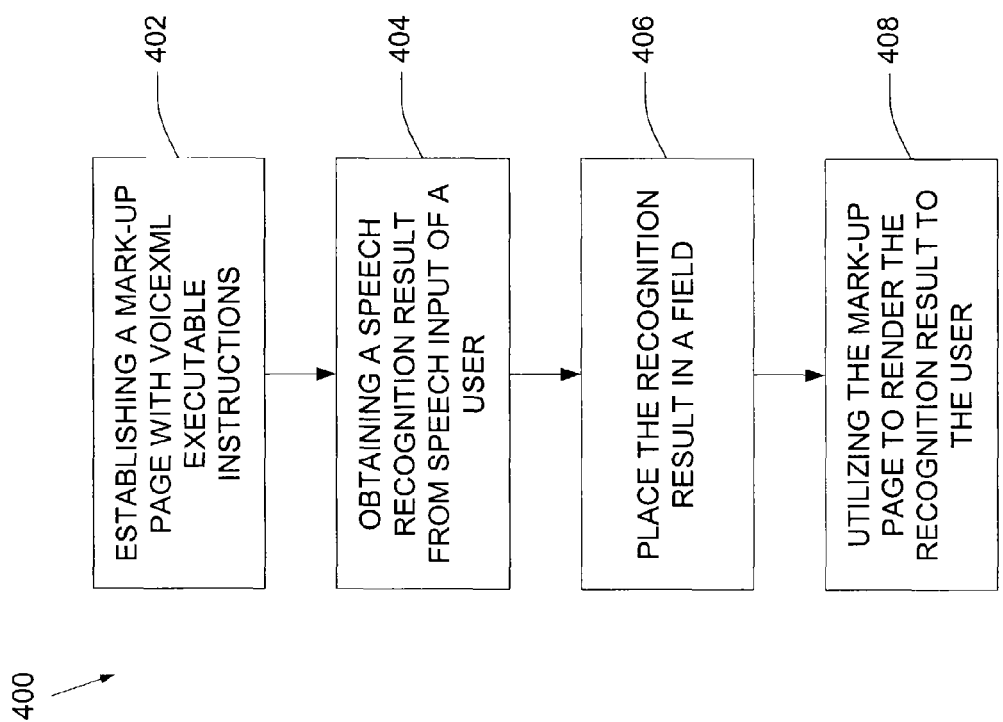
FIG. 12 is a block diagram of a method according to an embodiment of the present invention.

FIG. 12 illustrates another method 400 according to an embodiment of the present invention. Using method 400, a run time variable may be used to render data to a user without the need to submit a form to a remote server or otherwise access a further markup page. At step 402, a markup page is established with VoiceXML executable instructions. At step 404, a speech recognition result is obtained from the speech input of a user. At step 406, at least a portion of the result is placed in a field. Once the result has been placed in a field, the method proceeds to step 408, wherein the markup page is utilized to render the field to the user. For example, step 408 may be used to confirm one or more fields entered by the user.

Furthermore, the field can be used as a portion of a prompt that is played back to the user. When using a SALT <prompt> tag, run time variables can be rendered without a round trip to a remote server. In this situation, the computing power of the client is utilized without the need to connect to the remote server.

Figure 13:
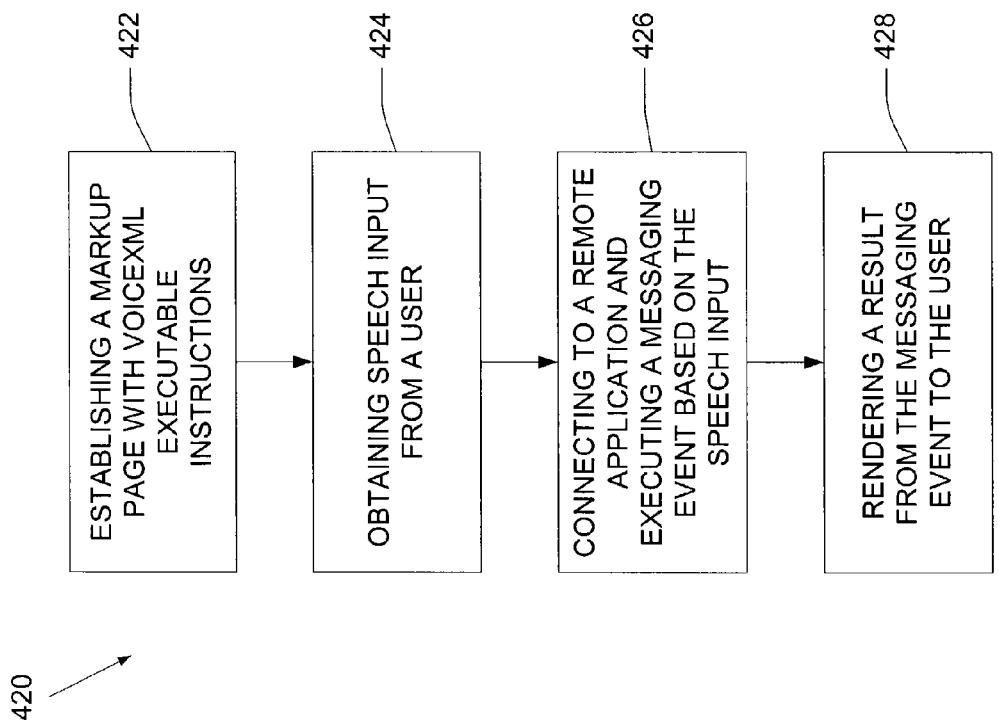
FIG. 13 is a block diagram of a method according to an embodiment of the present invention.

FIG. 13 illustrates a method 420 according to another embodiment of the present invention. The method begins at step 422 wherein a markup page with VoiceXML executable instructions is established. Next, at step 424, speech input is obtained from the user. At step 426, using the speech input, a connection is made to a web server and a messaging event is executed. For example, the web server may contain values that the user wishes to be rendered. At step 428, a result is rendered to the user that is based on information received from the messaging event.

FIG. 14 illustrates a markup page that renders a zip code to the user based on an input city. Markup page 450 includes VoiceXML executable instructions as well as SALT tags as discussed below. Heading 452 includes schemas that refer to VoiceXML and SALT and further establish "v:" as a delimiter of a VoiceXML tag and "s:" as a SALT tag. Instruction 454 declares a form in VoiceXML, which begins execution of the form interpretation algorithm. Thus, the form interpretation algorithm will execute the instructions in the form (which includes the instructions between the <v:form> tag and the </v:form> tag) until values in the form are filled. Instruction 456 declares a variable "answer" and assigns a null value to the variable. The form interpretation algorithm then proceeds through steps in order to prompt a user to enter a city and state so a zipcode may be found.

Instruction 458 declares a field named "city". In VoiceXML, a default handler for the field will fill the field upon a recognition event. A prompt tag 460 (which may be SALT or VoiceXML) prompts the user to say a city for which to search for a zipcode. SALT listen tag 462 triggers a recognition event having an associated grammar 464, which recognizes city names. Another associated grammar 465 recognizes state names in case the user wishes to enter a state name during an utterance. If a user enters speech input that is recognized as a city, the recognition event fills the "city" field. If a user enters speech input that is recognized as a state, the recognition event fills the "state" field.

The form interpretation algorithm proceeds to instruction 466 if the city field has been filled. Instruction 466 declares a field named "state", which will be filled upon a recognition event that is associated with a state grammar, which occur during the recognition event initialized by the listen tag 462. Prompt 468 prompts the user to say a state and listen tag 470 initializes a recognition event with associated grammars 472 and 474. Grammar 472 recognizes cities which grammar 474 recognizes states. With grammar 472, a user may choose a different city that will be recognized and fill the city field. Alternatively, a user may enter a state that is associated with state grammar 474 and is placed in the state field.

Instruction 476 is a conditional instruction that will execute instructions between the <v:filled> and </v:filled> tags if indeed the variables "city" and "state" have been filled. SALT messaging tag 478 initializes a messaging event that will return a zip code based on the city input by the user. Tag 478 used the "smex" object, which communicates with external components. SALT parameter tag 480 identifies the remote server that will be accessed to retrieve the zip code based on the city. Parameter tag 481 sends the city and state fields to the remote server. SALT bind tag 482 binds the zip code received from the remote server to the variable answer that was declared with instruction 456. SALT prompt tag 484 provides an output that includes both the city input by the user and the answer determined from the messaging event.

Although the present invention has been described with reference to particular embodiments, workers skilled in the art will recognize that changes may be made in form and detail without departing from the spirit and scope of the invention.

What is claimed is:

1. A computer readable storage medium having instructions that, when implemented on a computer cause the computer to process information, comprising:

a VoiceXML module executing a form interpretation algorithm, the VoiceXML module including instructions executed by a processor of the computer in a defined order based on an execution algorithm causing the computer to establish an interactive dialog with a user to complete the form, wherein the VoiceXML module declares a first field and a second field and the instructions process dialog events associated with at least one of recognition, prompting, and messaging events, wherein the form interpretation algorithm is initialized in response to instantiation of the form and the instructions of the VoiceXML module are executed in the defined order for processing prompting events in the dialog;

a SALT module having speech application language tags embedded within the VoiceXML module, the SALT module including at least one object having a temporal trigger initializing an operation associated with the instructions of the VoiceXML module during the interaction, wherein the operation initialized by the SALT module comprises at least one, but not all, of recognition, prompting, and messaging events, wherein the temporal trigger of the SALT module initializes a speech recognition event having a plurality of associated grammars, the speech recognition event obtaining a recognition result from the user having a plurality of portions, wherein the speech recognition event initialized by the SALT module associates a first portion of the recognition result with a first grammar of the plurality of grammars completing the first field declared by the VoiceXML module and associates a second portion of the recognition result with a second grammar of the plurality of grammars completing the second field declared by the VoiceXML module; and wherein the execution algorithm of the VoiceXML module automatically invokes the temporal trigger of the SALT module initializing the speech recognition event when the at least one object is encountered and automatically advances to a subsequent instruction in the defined order after completion of the speech recognition event.

2. The computer readable medium of claim 1 wherein the temporal trigger initializes a dual-tone multi-frequency (DTMF) recognition event.

3. The computer readable medium of claim 1 wherein the temporal trigger initializes a messaging event.

4. The computer readable medium of claim 1 wherein the VoiceXML module declares a first field and a second field and wherein the SALT module initializes a recognition event obtaining speech input from a user and fills the first field with a first portion of the speech input and fills the second field with a second portion of the speech input.

5. The computer readable medium of claim 4 wherein a first grammar is associated with the first field and a second grammar is associated with the second field.

6. The computer readable medium of claim 1 wherein the VoiceXML module declares a first field and a second field and wherein the SALT module initializes a recognition event obtaining an utterance having speech and DTMF input from a user and associates the speech input with the first field and the DTMF input with the second field.

7. The computer readable medium of claim 1 wherein the VoiceXML module declares a field and wherein the SALT module initializes a recognition event obtaining a recognition result from the user to fill the field and executes a prompt to render the field to the user.

8. The computer readable medium of claim 1 wherein the SALT module executes a messaging event to connect to a remote application.

9. The computer readable medium of claim 8 wherein the SALT module receives the result based on the messaging event and renders the result to a user.

10. The computer readable medium of claim 1 wherein the trigger is one of an indication of error, exception, recognition and no recognition.

11. The computer readable medium of claim 1 wherein the trigger is completion of a playback instruction.

12. The computer readable medium of claim 1 wherein the trigger is receipt of a message.

13. A computer readable storage medium having a markup page executable by a computer, that, when implemented, causes the computer to process information, comprising:
   a VoiceXML module having VoiceXML executable instructions that are executed by a processor of the computer establishing an interactive dialog between the computer and a user, wherein the VoiceXML module declares a first VoiceXML field and a second VoiceXML field and instantiates a form interpretation algorithm filling the first and second VoiceXML fields, the form interpretation algorithm controlling prompting events in a dialog flow with the user, the form interpretation algorithm looping through the VoiceXML executable instructions in a defined order until the first and second VoiceXML fields have been filled by the user;
   a SALT module having speech application language tags executing a speech recognition event associated with at least one prompting event controlled by the form interpretation algorithm instantiated by the VoiceXML module during the interaction, wherein the SALT module interrupts the form interpretation algorithm loop when a tag of the SALT module is encountered initializing the speech recognition event, wherein the speech recognition event is initialized obtaining speech input from a user and fills the first VoiceXML field with a first portion of the speech input and fills the second VoiceXML field with a second portion of the speech input; and
   wherein the form interpretation algorithm of the VoiceXML module automatically invokes an object of the SALT module initializing the speech recognition event when the tag of the SALT module is encountered and automatically advances to a subsequent instruction in the defined order after completion of the speech recognition event.

14. The computer readable medium of claim 13, wherein the form interpretation algorithm continuously loops though the VoiceXML executable instructions until the first and second VoiceXML fields have been filled.

15. The computer readable medium of claim 13 wherein a first grammar is associated with the first VoiceXML field and a second grammar is associated with the second VoiceXML field.

16. The computer readable medium of claim 13 wherein the SALT module initializes a recognition event having a plurality of grammars obtaining a recognition result and associates the recognition result with at least one of the plurality of grammars.

17. The computer readable medium of claim 13 wherein the SALT module initializes a recognition event obtaining an utterance having speech and DTMF input from a user and associates the speech input with the first field and the DTMF input with the second field.

18. The computer readable medium of claim 13 wherein the VoiceXML module declares a field and wherein the SALT module initializes a recognition event obtaining a recognition result from the user to fill the field and executes a prompt in the markup page rendering the field to the user.

19. The computer readable medium of claim 13 wherein the SALT module executes a messaging event to connect to a remote application.

20. The computer readable medium of claim 19 wherein the SALT module receives a result based on the messaging event and renders the result to a user.

21. A computer-implemented method for providing an interactive user interface comprising:
   establishing, using a processor of the computer, a stepwise dialog embodied in a VoiceXML module executing instructions in a defined order based on an execution algorithm associated with the VoiceXML module, the execution algorithm establishing an interactive dialog with a user, the instructions including objects for processing events in the dialog associated with speech prompting and messaging to the user in the interactive dialog, wherein establishing the stepwise dialog declares a first field and a second field to be filled with portions of an input from the user;
   providing a prompt to the user based on the execution algorithm using the VoiceXML module;
   receiving a user input that is a response to the prompt, the user input including a first portion having speech input from the user and a second portion having a dual-tone multi-frequency (DTMF) input from the user; and
   performing at least one object oriented operation embodied in a SALT module upon receiving the user input, wherein the at least one object oriented operation initializes a recognition event associating the speech portion of the user input with the first field and the DTMF portion of the user input with the second field.

22. The method of claim 21 wherein the object oriented operation is a speech recognition event.

23. The method of claim 21 wherein the object oriented operation is a DTMF recognition event.

24. The method of claim 21 wherein performing the operation further initiates a first grammar associated with the first field and a second field grammar associated with the second field.

25. The method of claim 21 wherein the operation initializes a recognition event having a plurality of grammars obtaining a recognition result and associates the recognition result with at least one of the plurality of grammars.

26. The method of claim 21 wherein establishing the stepwise dialog declares a field and wherein performing the object oriented operation includes initializing a recognition event obtaining a recognition result from a user to fill the field and execute a prompt to render the field to the user.

27. The method of claim 21 wherein the operation is a messaging event to connect to a remote application.

28. The method of claim 27 wherein the operation further receives a result based on the messaging event and renders the result to a user.

* * * * *